United States Patent

[11] 3,611,078

[72] Inventors Ernst Massar; Claus-Peter Parsch, both of Erlangen, Germany
[21] Appl. No. 812,039
[22] Filed Apr. 1, 1969
[45] Patented Oct. 5, 1971
[73] Assignee Siemens Aktiengesellschaft Berlin, Germany
[32] Priority Apr. 4, 1968
[33] Germany
[31] P 17 65 109.1

[54] STABILIZED AC SUPERCONDUCTOR
12 Claims, 2 Drawing Figs.

[52] U.S. Cl. 317/13 D, 338/32 S
[51] Int. Cl. H01v11/06, H02h 7/26
[50] Field of Search 338/32 S; 307/212, 306, 277; 340/173.1; 317/13 D

[56] References Cited

UNITED STATES PATENTS 3,201,765 8/1965 Pearl 340/173.1

*Primary Examiner*—Rodney D. Bennett, Jr.
*Assistant Examiner*—R. Kinberg
*Attorneys*—Curt M. Avery, Arthur E. Wilfond, Herbert L. Lerner and Daniel J. Tick

ABSTRACT: Described is an AC superconductor, comprised of a superconducting layer of type I or II intended for the load current, which is placed with a minimum contact resistance upon a metallic stabilizing layer which during overloading absorbs the current at least partially and temporarily. The stabilizing layer is comprised of a superconducting material of type III.

STABILIZED AC SUPERCONDUCTOR

Figure 1:
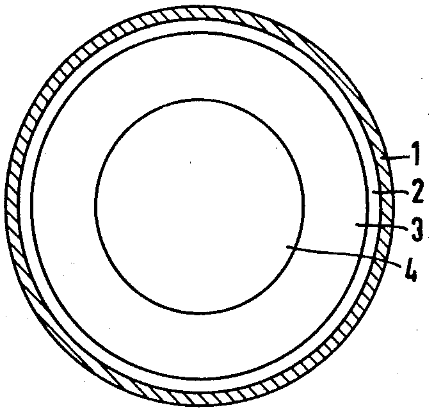

Our invention relates to an AC (alternating current) superconductor, comprised of a superconducting layer of type I or II, provided for a charge current. This layer is applied with a minimum contact resistance upon a metallic stabilizing layer which, during certain periods, absorbs, at least partially, the current during an overloading. Superconductors of type I or II have lower AC losses than do superconductors of type III below a critical charge current at which normal conductivity occurs.

There are three types of superconductors with regard to magnetic properties. In all three types, magnetization rises essentially linearly, up to a power load, which is specific for each type and each material, i.e. up to a magnetic field which corresponds to the specific current load. In the superconductor of type I, magnetization declines virtually discontinuously down to zero at the so-called critical field strength $H_c$. In a superconductor of type II, the magnetization curve also has a relatively sharp bend at the critical field intensity $H_{c1}$ but does not suddenly decay to zero, but becomes zero only gradually, at a field intensity $H_{c2}$. Thus, $H_{c2}$ and also the current passing through the superconductor are considerably greater than $H_{c1}$ and, thus, also the pertaining current. In a superconductor of type III, the magnetization curve, after an initial almost linear rise, passes a relatively flat maximum and then falls, during a further increase of the field strength, down to zero, although slower than in type II. At the end of the respective magnetization curve, i.e. where magnetization becomes zero at a high power load, the superconductor material assumes zero conductivity.

When a superconductor is intended for DC transport where high direct currents are expected, type II or even more preferably type III will be selected. These materials are called "hard" superconductors while type I is a "soft" superconductor. Type III, especially, loses its superconductivity only during relatively high field intensities, or current loads, due to the fact that the magnetization curve declines only slowly after the maximum.

If, on the other hand, the superconductor is to be used as an AC conductor, we must consider another effect, namely that the superconductor of type III shows a pronounced hysteresis for alternating currents above a certain magnitude. The hysteresis leads to losses which to the outside are manifested as ohmic losses dependent on the frequency and on the current. Although the superconductor type II does not show complete hysteresis, its magnetization curves do not coincide for a rising and a declining field, at least in a range between $H_{c1}$ and $H_{c2}$. Therefore, the superconductor of type II also entails certain alternating current losses, though the losses are slight, compared to the superconductor of type III. The type I superconductor has even smaller alternating current losses. Despite this fact, superconductors of type II are used to conduct alternating current, since their slight alternating current losses are easily overcompensated by their relatively high current carrying capacity.

The following are characteristic superconductors of the respective types:

Type I, pure lead (Pb)

Type II, pure niobium (Nb), particularly crystalline, undisturbed

Type III Technetium, niobium-zirconium (Nb–Zr), niobium-titanium (Nb–Ti), niobium-tin ($Nb_3Sn$).

Superconductors used for technical alternating current (50 to 60 Hz.) can be designed in form of a tube or a wire. Also feasible is the construction of tape-shaped superconductors for alternating current, possibly in the shape of a circle, e.g. tapes placed upon a tube. AC superconductors, comprised of thin layers of superconducting material of type I or II have good qualities and their losses are economically bearable. Tubes comprised of pure lead or pure niobium having thin walls are appropriate to this end. At relatively low current coverages (current densities), AC superconductors can be stabilized by a metal, such as aluminum or copper, which is normal-conducting at low temperatures.

At an alternating current of 50 Hz., the current-carrying limit of a niobium superconductor is a current whose magnetic field strength at the conductor surface amounts to approximately 1800 Oe (where Oe = Oersted). When this field strength is exceeded by a certain current increase or due to additional outside fields, the superconductor becomes normal-conducting. Exclusive stabilization of AC superconductors by low temperature normal-conductors, such as copper or aluminum, is successful only when we deal with relatively low current loads. During power transmission (transfer) with high current loads, for example via cables, low-temperature normal-conductors produce such high losses, due to current displacement, that adequate cooling for the purpose of restoring superconductivity is no longer feasible.

The danger of overloading a conductor exists in all switching operations where large portions of the circuit are superconducting, due to the DC components occurring in the current, whose decay velocity is sometimes very slight.

The invention has as its object a mode of stabilizing an AC superconductor, useful even for high current loads and overloading.

The technique of the present invention is to provide a stabilizing layer comprised of superconducting material of type III. Since type III superconductors have a considerably higher critical field intensity than superconductors of type I or II, the stabilizing layer of the present invention can still remain superconducting after it must absorb the entire current, when the layer provided for the load current becomes overloaded.

Figure 2:
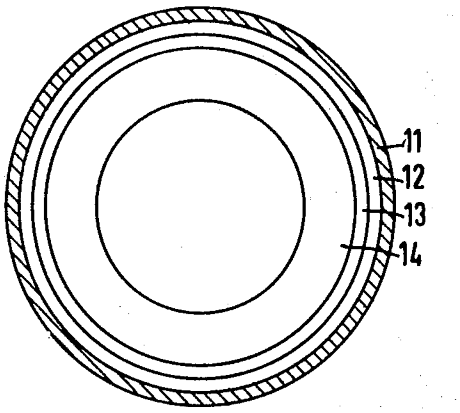

FIGS. 1 and 2 show, in cross section, a tubular AC superconductor according to the invention.

Thus, in accordance with the present invention, a favorable condition is obtained for the AC superconductor by stabilizing the superconductors of type I or type II, which carry the normal load current, e.g. lead or niobium, by providing a lower lying stabilizing layer, comprised of superconducting material of type III, with a higher critical field intensity for the alternating current. The last-mentioned layer is permitted to have considerably higher losses during an AC load than the layers of type I or II.

Suitable stabilizing layers are, fundamentally, all conventional type III superconductors, e.g. technetium. Niobium/zirconium, for instance, has a critical field strength of 1500 to 2000 Oe for alternating current of 50 Hz., depending on the share of niobium, whereas only approximately five times as many losses must be taken into account here as in a superconductor of type I of II, provided the latter would still be superconductive at the indicated frequencies and fields.

The depth of penetration of the alternating current is below 1 $\mu$ for the superconducting layer, which conducts the normal load current, as well as for the stabilizing layer. Thus, current displacements caused by frequency cannot occur. Since, furthermore, the type III superconductor should be regarded a current-and-frequency-dependent ohmic resistance, the stabilization layer of the present invention carries almost no current due to the low depth of penetration when the current or field strength values are below the magnetic field values that are critical for type I or II superconductors. Hence, the losses in the stabilizing layer are negligible in this field range. In higher field strength values, the AC losses in a type III superconductor are comparable to the losses which occur with direct current in copper or aluminum. As the critical field strength of type III superconductors—depending on the material—is 1½ to 2 times higher than that of type I or II superconductors, the present invention offers an AC stabilization layer which affords similar benefits as copper or aluminum for the stabilization of DC, or quasi DC, superconductors.

According to a further development of the invention, it is particularly favorable if the superconductor of type I or II, intended for the load current, surrounds the superconductor, provided for stabilization, in the form of a tube. In this manner, wire or tube-shaped superconductors can be produced. Tubular superconductors are especially preferred, since they can be cooled from the inside and from the outside, for example by means of liquid helium.

According to another development of the invention, especially in the case of tubular AC superconductors, the outer layer of type I or II as well as the successive inner layer of type III need not be thicker, with respect to current carrying capacity, than a few μ, e.g. 1 to 10 μ. Preferably, both layers, e.g. niobium and technetium, are placed upon a copper or aluminum core which acts as a stabilizer at still higher currents which even exceed the critical field intensity of the type III superconductor, e.g. up to the switch-off time and, thus, prevents the destruction of the superconducting layers. This core is preferably constructed of low-temperature, normal-conducting material in the shape of a tube, in order to remove the losses occurring toward the inside, with the aid of the helium that flows therein. The conductor may be circled, instead or in addition, by liquid helium, on the outside.

According to a further embodiment, it may prove favorable to provide two or more layers for stabilizing the superconducting material. These layers should contact each other with a minimal contact resistance and should possess higher critical field intensities for the alternating current, at an increased distance from the superconductor of type I or II carrying the load current. Here, too, the final layer is preferably a layer comprised of a low-temperature normal-conductor.

In FIG. 1 a tubular AC superconductor according to the invention is shown in cross section. The cross section is circular, though the superconductor of the present invention is not limited to a circular cross section, even when designed as a tube. The outer layer 1 in the FIG. symbolizes a superconductor layer of type I or II, for example pure lead or pure niobium. Layer 2 should be a superconductor of type III, e.g. technetium, niobium-titanium, niobium-zirconium or niobium-tin. In the example shown in the drawing, both superconducting layers 1 and 2 are positioned upon a carrier 3. This carrier may be comprised of a low-temperature normal-conductor, such as copper or aluminum. It may be hollow or solid. If the carrier is hollow, liquid helium can flow through the passage 4, during operation, and act as a coolant. The superconductor can be also circulated by helium on the outside. Layers 1 and 2 can both be approximately 1 to 2 μ thick and be comprised of niobium, or technetium respectively. Due to the relatively slight radioactivity of the technetium, appropriate safety measures should be undertaken during its use according to the invention.

FIG. 2 shows another embodiment of a tubular AC superconductor according to the invention, seen in cross section. In this example, several layers 12 and 13 are provided which, for stabilization purposes, are comprised of superconducting material of type III. Layer 13 which is further removed from superconducting layer 11 of type I, respectively II, provided for the load current, has a higher critical field intensity for alternating current than layer 12 which is directly adjacent to layer 11. Layers 11 to 13 are placed upon a tubular low-temperature normal-conductor 14. The superconductor of the present invention can be produced in different ways, as for example with the aid of a method whereby the superconducting materials are reduced, through dissociation of appropriate halogens (chlorides and/or bromides) by hydrogen, and thus precipitated. In this manner, niobium and tin can be precipitated from a mixture of niobium chloride and tin chloride, in a reaction furnace, e.g. upon a copper tube, so that a layer of niobium-tin ($Nb_3Sn$) forms. In another reaction furnace, or in another coating chamber of the same furnace, niobium can be precipitated out of pure niobium chloride, upon the niobium-tin layer. The stabilizing layer(s) according to the invention and the superimposed superconducting layer of type I or II can also be placed upon a carrier, by using a plasma jet method. Electrolysis processes are also suitable for producing the superconductors, in accordance with the present invention. Technetium, for example, can be deposited from its saline solutions through a cathodic reduction or precipitated by zinc.

We claim:

1. An AC superconductor, comprised of a superconducting layer of type I intended for the load current, which is placed with a minimum contact resistance upon a metallic stabilizing layer of a superconducting material of type III, which during overloading absorbs the current, at least partially and temporarily, said superconductor of type I encloses said superconductor of type III provided for stabilizing purposes in the form of a tube.

2. The superconductor of claim 1 wherein the superconducting layer of type I is lead.

3. The superconductor of claim 1, wherein the superconductors are concentric tubes.

4. The superconductor of claim 3, wherein at least two mutually contacting layers of superconducting material of type III, provided for stabilization, are present which have higher critical field strengths for the alternating current the further they are from the superconductor of type I, which is provided for the current load.

5. The superconductor of claim 1, wherein the superconductor consists of a core which has normal electrical conductivity at low temperatures, with at least two layers of superconducting material placed thereon and having a critical field strength for the alternating current which declines toward the outside.

6. The superconductor of claim 5, wherein the core is selected from copper and aluminum.

7. The superconductor of claim 5, wherein the core is a tube upon whose outer wall the superconductor layers are placed.

8. The superconductor of claim 5, wherein the thickness of the respective superconducting layer is between 1 and 10 μ.

9. An AC superconductor, comprised of a superconducting layer of type II intended for the load current, which is placed with a minimum contact resistance upon a metallic stabilizing layer of a superconducting material of type III, which during overloading absorbs the current at least partially and temporarily, said superconductor of type II encloses the superconductor of type III provided for stabilizing purposes, in the form of a tube.

10. The superconductor of claim 9 wherein the superconductors are concentric tubes.

11. The superconductor of claim 10 wherein at least two mutually contacting layers of superconducting material of type III, provided for stabilization, are present which have higher critical field strengths for the alternating current the further they are from the superconductor of type II which is provided for the current load.

12. The superconductor of claim 9 wherein the superconducting layer of type II is niobium.